US008755361B2

(12) United States Patent
Li

(10) Patent No.: US 8,755,361 B2
(45) Date of Patent: Jun. 17, 2014

(54) METHOD, SYSTEM AND SIGNALING GATEWAY FOR ENABLING MESSAGE INTERCOMMUNICATION BETWEEN GSM AND CDMA

(75) Inventor: Zhengxiang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 13/257,919

(22) PCT Filed: May 18, 2010

(86) PCT No.: PCT/CN2010/072893
§ 371 (c)(1),
(2), (4) Date: Feb. 22, 2012

(87) PCT Pub. No.: WO2011/023000
PCT Pub. Date: Mar. 3, 2011

(65) Prior Publication Data
US 2012/0134278 A1    May 31, 2012

(30) Foreign Application Priority Data
Aug. 28, 2009  (CN) .......................... 2009 1 0189776

(51) Int. Cl.
*H04L 12/28*    (2006.01)
(52) U.S. Cl.
USPC ........................................................ 370/335
(58) Field of Classification Search
CPC ..... H04W 88/06; H04B 1/701; H04B 7/2615; H04B 7/2618
USPC .................................. 370/328, 335, 337, 342
See application file for complete search history.

(56) References Cited

U.S. PATENT DOCUMENTS

| 2005/0075106 A1* | 4/2005 | Jiang ........................... 455/432.3 |
| 2005/0083918 A1 | 4/2005 | Tian |
| 2006/0240819 A1* | 10/2006 | Xu et al. .................... 455/432.1 |
| 2007/0254648 A1* | 11/2007 | Zhang et al. .................. 455/433 |

FOREIGN PATENT DOCUMENTS

| CN | 1310537 A | 8/2001 |
| CN | 101009871 A | 8/2007 |
| CN | 101635899 A | 1/2010 |

OTHER PUBLICATIONS

International Search Report in international application No. PCT/CN2010/072893, mailed on Jul. 22, 2010.
English Translation of the Written Opinion of the International Search Authority in international application No. PCT/CN2010/072893, mailed on Jul. 22, 2010.

* cited by examiner

*Primary Examiner* — Raj Jain
(74) *Attorney, Agent, or Firm* — Oppedahl Patent Law Firm LLC

(57) ABSTRACT

A method, a system and a signaling gateway for enabling message intercommunication between a GSM network and a CDMA network are provided. The method includes: setting a GSM-CDMA (GC) signaling gateway in a service processor of a CDMA short message service center; during processing a message from the GSM network to the CDMA network, a GSM short message service center sending a mobile terminated request message to the GC signaling gateway, and the GC signaling gateway converting a GSM message into a CDMA message according to the mobile terminated request message and sending the converted CDMA message to a target CDMA subscriber; and, during processing a message from the CDMA network to the GSM network, a CDMA service processor converting a CDMA message into a GSM message and sending the converted GSM message to a target GSM subscriber.

14 Claims, 9 Drawing Sheets

METHOD, SYSTEM AND SIGNALING GATEWAY FOR ENABLING MESSAGE INTERCOMMUNICATION BETWEEN GSM AND CDMA

TECHNICAL FIELD

The disclosure relates to the technical field of communications, in particular to a method, system, and signaling gateway for enabling message intercommunication between a Global System for Mobile Communications (GSM) network and a Code Division Multiple Access (CDMA) network.

BACKGROUND

The existing communication system is mainly the GSM network and CDMA network; and the coexistence of the GSM and CDMA absolutely introduces the GSM-CDMA (GC) intercommunication which means that a GSM subscriber sends a message to a CDMA subscriber or a CDMA subscriber sends a message to a GSM subscriber.

In order to process the GC intercommunication message well, it is necessary to forward a GSM message from a GSM short message service center to a CDMA short message service center, and vice versa. Because of the different protocols of the GSM and the CDMA, the message needs to be converted.

At present, the GC intercommunication message is forwarded by an intercommunication gateway in China, i.e., a short message service center converts an intercommunication message into an opened Short Message Peer to Peer (SMPP) message and then forwards it to an intercommunication gateway, and the intercommunication gateway submits the SMPP message to another short message service center which converts the SMPP message into a corresponding message for processing.

However, internationally, in consideration of charging and the like, operators do not recognize the intercommunication way through the SMPP and require that the GC intercommunication message should be forwarded via the NO. 7 signaling, that is, be forwarded by the GC signaling gateway. At present, the GC signaling gateway is implemented by a front-end processor and firstly requires that a front-end processor module should support both the GSM and CDMA protocols as well as the conversion between a GSM message and a CDMA message. The GSM network identifies a subscriber by the International Mobile Subscriber Identifier (IMSI), while the CDMA network identifies a subscriber by the IMSI or the Mobile Identification Number (MIN), so, if the CDMA network adopts the MIN, the front-end processor needs to convert the MIN into the IMSI. If it is required to support number portability, the front-end processor needs to set Global Translation (GT) in different formats according to the home of the target number. It can be seen from above that the GC signaling gateway implemented by the front-end processor is complex to process and also inconvenient to process due to the limited system resources of the front-end processor.

SUMMARY

In view of the abovementioned related art, the disclosure provides a method for enabling the message intercommunication between a GSM network and a CDMA network, which can make the GC intercommunication more easy and convenient to process on the basis of the NO. 7 signaling.

The disclosure further provides a system and a signaling gateway for enabling the message intercommunication between the GSM network and the CDMA network.

In order to solve the abovementioned problem, the disclosure adopts the following technical solution:

A method for enabling the message intercommunication between a GSM network and a CDMA network, including:

a GC signaling gateway is set in a service processor of a CDMA short message service center;

during processing a message from the GSM network to the CDMA network, a GSM short message service center sends a mobile terminated request to the GC signaling gateway, and the GC signaling gateway converts a GSM message into a CDMA message according to the mobile terminated request message and sends the converted CDMA message to a target CDMA subscriber; and during processing a message from the CDMA network to the GSM network, a CDMA service processor converts a CDMA message into a GSM message and sends the converted GSM message to a target GSM subscriber.

In one embodiment of the method, the process of processing a message from the GSM network to the CDMA network sequentially includes a routing query stage and a message sending stage, in the routing query stage, the GSM short message service center sends a mobile terminated request message to the GC signaling gateway; and the GC signaling gateway performs routing query according to the information of the target CDMA subscriber in the mobile terminated request message to obtain a routing query result; and in the message sending stage, the GC signaling gateway converts the GSM message into the CDMA message and sends the converted CDMA message to the target CDMA subscriber according to the routing query result.

In the routing query stage, the GC signaling gateway sends a routing query of the target CDMA subscriber to the home location register of the CDMA network according to the information of the target CDMA subscriber in the mobile terminated request, and establishes and stores the mapping relationship among the Mobile Directory Number (MDN), the Visit Mobile Switching Center address (VMSCAddr) and the IMSI of the GSM network; and in the message sending stage, the GC signaling gateway obtains the MDN and VMSCAddr through the parameter IMSI in the GSM message from the GSM network according to the mapping relationship, converts the GSM message into the CDMA message and sends the converted CDMA message to the target CDMA subscriber.

In one embodiment of the method, the process of processing a message from the GSM network to the CDMA network includes the following normal flow:

AA1, the GSM short message service center sends the short message request routing signaling (SRI) message of a front-end processor to a GSM front-end processor of the CDMA network;

AA2, the GSM front-end processor of the CDMA network receives the SRI message, and sends the internal routing query (SRIReq) message of a front-end processor and a service processor to the GC signaling gateway;

AA3, the GC signaling gateway receives the SRIReq message, sends a target subscriber routing information query (SmsReqReq) message to the CDMA front-end processor to query the routing information of the target subscriber;

AA4, the CDMA front-end processor receives the SmsReqReq message, sends the routing information signaling query (SMSREQ) message of the front-end processor to the home address location register of the CDMA network, to search for the routing information of the target subscriber, and returns a target subscriber routing information query response (SmsReqAck) message to the GC signaling gateway after receiving the routing information signaling query response (smsreq) message of the front-end processor from the home address location register of the CDMA network;

AA5, the GC signaling gateway receives the SmsReqAck message, if the MIN of the CDMA network is returned in the SmsReqAck message, the MIN is converted into the IMSI of the GSM network, and the mapping relationship among the MDN, VMSCAddr and the IMSI is stored;

AA6, the GC signaling gateway returns the SRI response (SRIAck) message to the GSM front-end processor of the CDMA network, wherein the SRIAck message includes the IMSI and VMSCAddr;

AA7, the GSM front-end processor of the CDMA network receives the SRIAck message and returns the SRI response (sri) message to the GSM short message service center, wherein the VMSCAddr returned by the GC signaling gateway is replaced with the GC signaling gateway address in the sri message;

AA8, the GSM short message service center sends a short message mobile terminated signaling (MT_FWD) message to the GSM front-end processor of the CDMA network according to the GC signaling gateway address returned by the sri message;

AA9, the GSM front-end processor of the CDMA network receives the MT_FWD message and sends a mobile terminated request (MtFwdReq) message to the GC signaling gateway, wherein the MtFwdReq message includes the IMSI;

AA10, the GC signaling gateway obtains the MDN and VMSCAddr by the query of the IMSI according to the mapping relationship among the MDN, VMSCAddr and the IMSI, and converts the GSM message into the CDMA message;

AA11, the GC signaling gateway sends a CDMA mobile terminated (MtToMscReq) message to the CDMA front-end processor, wherein the MtToMscReq message includes the VMSCAddr;

AA12, the CDMA front-end processor sends a mobile terminated request signaling (SMDPP) message of the front-end processor to the mobile switching center of the CDMA network visited by the target subscriber according to the VMSCAddr; and returns a CDMA mobile terminated message response (MtToMscAck) message to the GC signaling gateway after receiving the SMDPP message response (smdpp) message returned by the mobile switching center of the CDMA network;

AA13, the GC signaling gateway receives the MtToMscAck message and returns the mobile terminated request message response (MtFwdAck) message to the GSM front-end processor of the CDMA network;

AA14, the GSM front-end processor of the CDMA network receives the MtFwdAck message and returns the short message mobile terminated signaling message response (mt_fwd) message to the mobile switching center of the GSM network; and AA15, the mobile switching center of the GSM network receives the mt_fwd message, with flow ended.

In the Step AA4, if the routing query fails to be returned in the smsreq message received by the CDMA front-end processor, in the Step AA7, the sri message returned by the GSM front-end processor of the CDMA network to the GSM short message service center includes a failure code, with flow ended.

In one embodiment of the method, the process of processing a message from a GSM network to a CDMA network includes the following failure flow:

AB1, If the mobile terminating fails to be sent and is stopped from retrying, the GSM short message service center sends a report short message delivery result signaling (RDS) message of a front-end processor to the GSM front-end processor of the CDMA network;

AB2, the GSM front-end processor of the CDMA network receives the RDS message and sends the report short message delivery (RDSReq) message to the GC signaling gateway, wherein the RDSReq message includes the MDN;

AB3, the GC signaling gateway stores the mapping relationship between the MDN and the short message service center address scAddr in an MWD table and returns an RDS message response (RDSAck) message to the GSM front-end processor of the CDMA network; and the GSM front-end processor of the CDMA network receives the RDSAck message and returns an RDS response (rds) message to the GSM short message service center; and AB4, the GSM short message service center receives the rds message, with flow ended.

In one embodiment of the method, the process of processing a message from a GSM network to a CDMA network includes the following notification flow:

AC1, the mobile switching center of the CDMA network sends a notification message signaling (SMSNOT) message to the CDMA front-end processor;

AC2, the CDMA front-end processor receives the SMSNOT message, and sends a start notification (SmsNotReq) message to the GC signaling gateway; and the GC signaling gateway returns the start notification message response (SmsNotAck) message to the CDMA front-end processor;

AC3, the CDMA front-end processor receives the SmsNotAck message, and sends a notification message signaling response (smsnot) message to the mobile switching center of the CDMA network;

AC4, the GC signaling gateway searches for the MWD table according to the MDN, and sends a GSM notification (AlertScReq) message to the GSM front-end processor of the CDMA network if a record can be found, wherein the AlertScReq message includes a short message service center address scAddr;

AC5, the GSM front-end processor of the CDMA network sends the AlertScReq message to the GSM short message service center according to the scAddr;

AC6, the GSM short message service center triggers retry and returns the GSM notification message response (AlertScAck) message to the GSM front-end processor of the CDMA network;

AC7, the GSM front-end processor of the CDMA network receives the AlertScAck message and returns the AlertScAck message to the GC signaling gateway; and AC8, the GC signaling gateway receives the AlertScAck message and deletes the mapping between the MDN and scAddr in the MWD table, with the flow ended.

In one embodiment of the method, the process of processing a message from the CDMA network to the GSM network includes: a CDMA service processor converts a CDMA message into a GSM message; and sends the message to the GSM front-end processor of the CDMA network; and the GSM front-end processor of the CDMA network performs routing query and sends the GSM message to a target GSM subscriber.

In one embodiment of the method, the process of processing a message from a CDMA network to a GSM network includes the following normal flow:

BA1, the CDMA front-end processor receives the SMDPP message from the mobile switching center of the CDMA network and sends the internal originating request (MoReq) message of the CDMA short message service center to the CDMA service processor;

BA2, the CDMA service processor receives the MoReq message, performs originating process and returns the MoReq message response (MoAck) message to the CDMA front-end processor;

BA3, the CDMA front-end processor receives the MoAck message and returns the smdpp message to the mobile switching center of the CDMA network;

BA4, for the message of a target subscriber which is a GSM, the CDMA service processor converts the message into a GSM message and sends a GSM mobile terminated request (MtDataReq) message to the GSM front-end processor of the CDMA network;

BA5, the GSM front-end processor of the CDMA network sends an SRI message to the home location register of the GSM network according to the configuration to search for the routing information of a target number; and the home location register of the GSM network returns an sri message to the GSM front-end processor of the CDMA network;

BA6, the GSM front-end processor of the CDMA network returns routing information according to the sri message and directly sends an MT_FWD message to the mobile switching center of the GSM network visited by the target subscriber; and the mobile switching center of the GSM network visited by the target subscriber returns an mt_fwd message to the GSM front-end processor of the CDMA network;

BA7, the GSM front-end processor of the CDMA network receives the mt_fwd message and returns the GSM mobile terminated request message response (MtDataAck) message to the CDMA service processor; and BA8, the CDMA service processor receives the MtDataAck message, with flow ended.

In one embodiment of the method, the process of processing a message from a CDMA network to a GSM network includes the following failure flow:

BB1, If the mobile terminating fails to be sent and is stopped from retrying, the GSM front-end processor of the CDMA network sends an RDS message to the home location register of the GSM network; and the home location register of the GSM network records the short message service center address of the RDS message, i.e., the address of the GC signaling gateway; and BB2, the mobile switching center of the GSM network returns an rds message to the GSM front-end processor of the CDMA network, with flow ended.

In one embodiment of the method, the process of processing a message from a CDMA network to a GSM network includes the following notification flow:

BC1, the mobile switching center of the GSM network triggers the GSM MAP notification message signaling (Alert_Sc) message according to the recorded address of the short message service center and sends it to the GSM front-end processor of the CDMA network; the recorded address of the short message service center is the address of the GC signaling gateway; the GSM front-end processor of the CDMA network receives the Alert_Sc message and sends an AlertScReq message to the CDMA service processor;

BC2, the CDMA service processor receives the AlertScReq message, processes the retry message and returns the AlertScAck message to the GSM front-end processor of the CDMA network; and the GSM front-end processor of the CDMA network receives the AlertScAck message and returns the Alert_Sc message to the mobile switching center of the GSM network; and BC3, the mobile switching center of the GSM network receives the Alert_Sc message, with the flow ended.

The disclosure also discloses a system for enabling the message intercommunication between a GSM network and a CDMA network, including a GSM short message service center and a CDMA service processor positioned inside a CDMA short message service center and containing a GC signaling gateway, wherein the GC signaling gateway is set to convert a GSM message into a CDMA message according to the mobile terminated request of the GSM short message service center and send the converted CDMA message to a target CDMA subscriber; and the CDMA service processor is set to convert a CDMA message into a GSM message and send the converted GSM message to a target GSM subscriber.

In one embodiment of the system, the CDMA short message service center includes a GSM front-end processor of the CDMA network, a CDMA front-end processor, a mobile switching center of the CDMA network and a home location register;

the GC signaling gateway is set to perform routing query on the mobile switching center of the CDMA network and the home location register through the CDMA front-end processor according to the information of the target CDMA subscriber in the mobile terminated request in the GSM short message service center, convert a GSM message into a CDMA message, and send the converted CDMA message to the target CDMA subscriber according to the routing query result; and the CDMA service processor is set to convert a CDMA message into a GSM message, and send a termination request message to the GSM front-end processor of the CDMA network; and the GSM front-end processor of the CDMA network performs routing query and sends the GSM message to a target GSM subscriber.

The disclosure also discloses a signaling gateway for the message intercommunication between the GSM network and the CDMA network, wherein the signaling gateway is set in a service processor at a CDMA short message service center and is set to convert a GSM message into a CDMA message according to the mobile terminated request of the GSM short message service center and send the converted CDMA message to a target CDMA subscriber.

Compared with the related art, the disclosure has the following advantages:

Compared with the GC signaling gateway implemented by a front-end processor, the GC signaling gateway of the disclosure which is implemented by a service processor has obvious advantages. The front-end processor runs on single boards each having a limited processing capacity, so the processing capacity of the front-end processor can be only improved by physically increasing the amount of the single boards; and if one frame cannot meet the requirement, frames also need to be added, so the expansion is inconvenient. In addition, due to the limited memory of the front-end processor, it is necessary to particularly allocate a memory for storing MWD data in order to realize the function of the GC signaling gateway, which affects the performance of the front-end processor. The front-end processor should be only in charge of signaling forwarding; however, in the implementation of the front-end processor in implementing the GC signaling gateway, the front-end processor also needs to perform many service processes, such as converting a GC message, converting the MIN into the IMSI, converting a GC error code and the like, which increases the complexity of the front-end processor. The disclosure implements the GC signaling gateway by a service processor to better solve the problem in the implementation of the front-end processor; the service processor runs on a mini computer which has a much greater processing capacity than that of the single boards; and the resources for storing the MWD data also have a little influence on the service processor. Besides, the way of implementing the GC signaling gateway by the service processor also meets the requirements of international operators to enable the GC intercommunication by the NO. 7 signaling.

DETAILED DESCRIPTION

Figure 1:
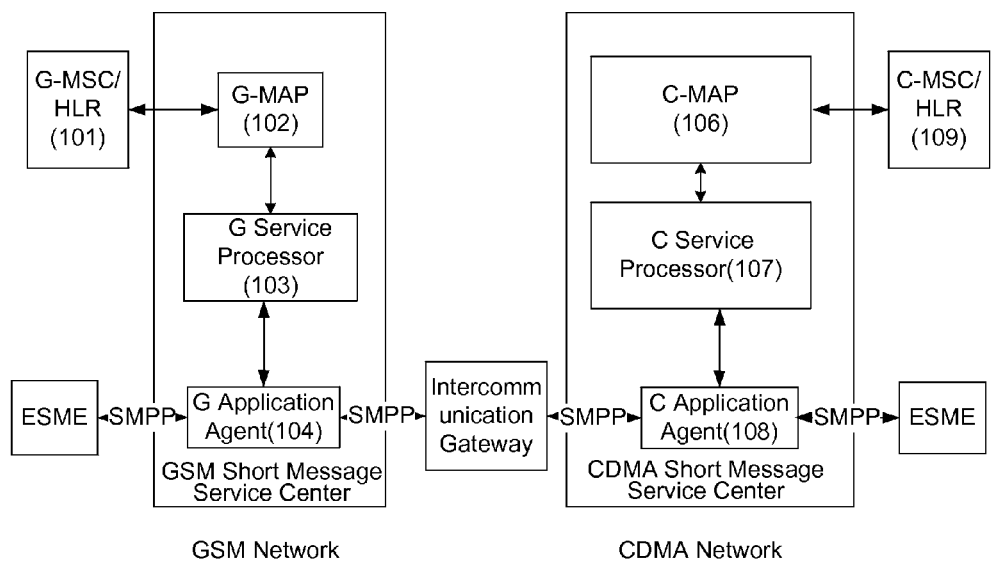
FIG. 1 is a diagram showing the structure of a system for enabling GC intercommunication by an intercommunication gateway, wherein a CDMA short message service center is not modified.

The disclosure is further detailed below in conjunction with the accompanying drawings and specific embodiments.

Considering the requirements of the international operators for intercommunication gateway adopting the NO. 7 signaling, as well as the complexity and limitation of implementing the GC signaling gateway by the front-end processor, the disclosure provides a method, system and signaling gateway for enabling the message intercommunication between a GSM and a CDMA by the NO. 7 signaling based on a service processor, in order to solve the abovementioned problems.

In order to enable the signaling intercommunication between the GSM and the CDMA in a service processor, a GC signaling gateway may be set in a CDMA service processor of a CDMA short message service center to respectively enable the processing of a message from the GSM network to the CDMA network and from the CDMA network to the GSM network. It should be understood that the two message processing processes are independent, and performed upon the occurrence of respective message processing events, which may be performed either at the same time or at different time and have no successive logical relationship on time.

For a message from a GSM network to a CDMA network, i.e., a GSM subscriber sends a message to a CDMA subscriber, the main message processing process includes: a GSM short message service center sends a mobile terminated request to a GC signaling gateway; and the GC signaling gateway converts a GSM message into a CDMA message and sends the converted CDMA message to the CDMA network. The process includes two steps: firstly, routing query; and secondly, sending a short message. The GC signaling gateway serves as a Home Location Register (HLR) in the GSM short message service center in the routing query process, for storing the basic information of a subscriber therein, such as the number of an SIM card, a phone number, and subscription information; and serves as a Mobile Switching Center (MSC) in the GSM short message service center in the process of sending a short message, for controlling the services of all base stations and providing switching functions and the connection with other functions of the system as the core of the whole GSM network. The GC signaling gateway serves as the HLR in the GSM short message service center in the flow of processing a notification message.

For a message from a CDMA network to a GSM network, i.e., a CDMA subscriber sends a message to a GSM subscriber, the main message processing process includes: a CDMA service processor directly converts a CDMA message into a GSM message and sends a Mobile Terminated (MT) request message to a GSM front-end processor of the CDMA short message service center; and because the GSM front-end processor of the CDMA short message service center has stored the routing information of the home GSM network of the called party, the GSM front-end processor sends a routing information query to the HLR of the called party and sends the message to the MSC of the home GSM network of the called party according to the returned address of the MSC.

Figure 3:
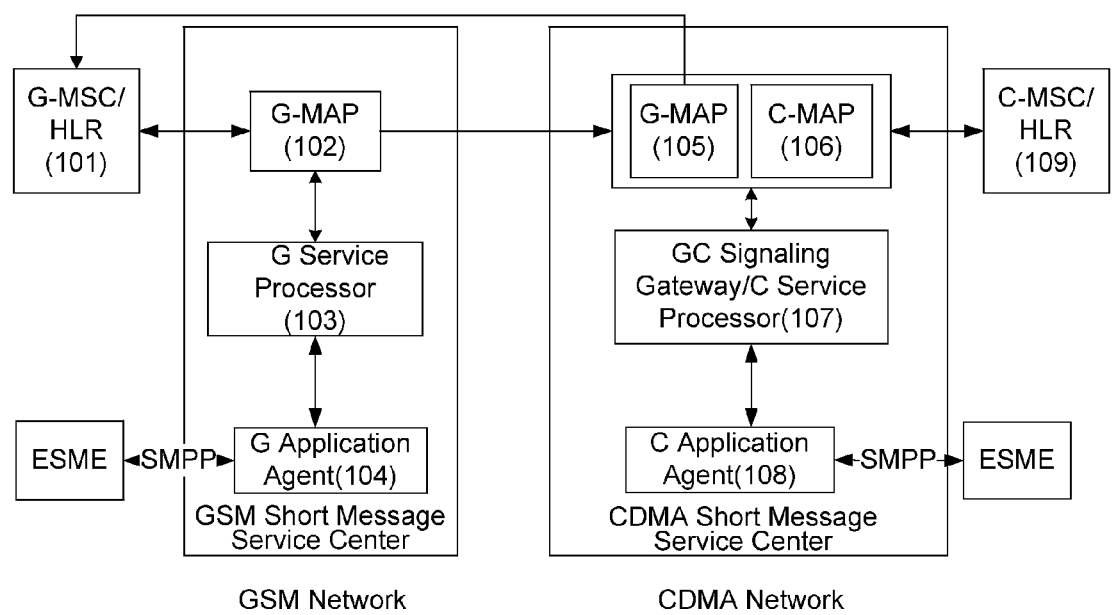
FIG. 3 is a diagram showing the structure of a system in one embodiment of the disclosure, in comparison with FIG. 1, a G-MAP and a C-MAP are integrated in the front-end processor in the CDMA short message service center; and in comparison with FIG. 2, a GC signaling gateway function is added in the service processor instead of adding a GC conversion module in the front-end processor in the CDMA short message service center, wherein the GC signaling gateway is used for enabling the GC message conversion.

As shown in FIG. 3, the system for enabling the GC intercommunication of the GSM network and the CDMA network by the NO. 7 signaling, includes the following elements:

1. A GSM network subsystem:
G-MSC/HLR 101, GSM MSC/HLR module, wherein the G-MSC is the mobile switching center of the GSM network; and the G-HLR is the home location register of the GSM network. The G-MSC is used for processing the messages of a base station and a G-MAP 102, and the G-HLR is used for processing the routing query message of the G-MAP 102. At present, the MSC is generally integrated with the HLR.

A G-MAP 102, the GSM front-end processor module of the GSM short message service center (the GSM front-end processor of the GSM network for short), may be multiple modules, each of which is able to be connected with one or more service processor modules for sharing load. The G-MAP 102 is used for processing the messages of the G-MSC/HLR 101 and the GSM service processor 103; and in one embodiment of the disclosure, when a target number is a subscriber of the CDMA network, the target number is oriented to the GC signaling gateway by configuration; and the G-MAP 102 sends a routing query message and a mobile terminated message to the G-MAP 105.

The GSM service processor 103, the GSM service processor module (G service processor for short), may be multiple modules each of which is in charge of processing number segments in different proportions to share load. The GSM service processor 103 is used for processing the messages of the G-MAP 102 and the G-Agent 104 described below.

The G-Agent 104, the SMPP application agent module of the GSM, may be multiple modules for completing the conversion between the SMPP standard message and internal messages of the system. The G-Agent 104 is used for processing the messages of the GSM service processor 103 and an extended short message entity (ESME). In the disclosure, the G-Agent 104 is not used.

The GSM short message service center includes a G-MAP 102, a GSM service processor 103 and a GSM-Agent 104.

2. A CDMA network subsystem:

a G-MAP 105, a GSM front-end processor module of the CDMA short message service center (GSM front-end processor of the CDMA network for short), may be multiple modules. The G-MAP 105 is used for receiving the routing query and mobile terminated messages of the G-MAP 102 and also directly sending the message, which is to be sent to the GSM by the mobile terminated message of the GC signaling gateway/the CDMA service processor 107, to the MSC of the GSM network.

The C-MAP 106, the CDMA front-end processor module, may be multiple modules, each of which is able to be connected with one or more short message service centers for sharing load. The C-MAP 106 processes the messages of the GC signaling gateway/the CDMA service processor 107 and the C-MSC/HLR 109.

In one embodiment of the disclosure, the front-end processor of the CDMA short message service center includes G-MAP 105 and C-MAP 106 modules.

The GC signaling gateway/CDMA service processor 107 may be multiple modules, each of which is in charge of processing number segments at different proportions for sharing load. The CDMA service processor 107 (C service processor for short) is used for processing the messages of the G-MAP 105, C-MAP 106 and C-Agent 108. The GC signaling gateway is one sub-module of the CDMA service processor 107 and used for enabling the conversion between the GSM messages and CDMA messages.

The G-Agent 108, the SMPP agent module in the CDMA network, may be multiple modules for completing the conversion between the SMPP standard message and internal messages of the system. The C-Agent 108 is used for processing the messages of the GC signaling gateway/the CDMA service processor 107 and the ESME. In the disclosure, the G-Agent 108 is not used.

A C-MSC/HLR 109, a CDMA MSC/HLR module, is the mobile switching center and the home location register of the CDMA network respectively. The C-MSC is used for processing a message of a base station and a C-MAP 106. The C-HLR is used for processing the routing query message of the C-MAP 106. At present, the MSC is generally integrated with the HLR.

The CDMA short message center includes a G-MAP 105, a C-MAP 106, a GC signaling gateway/a CDMA service processor 107, and a C-Agent 108.

For a clearer comparison, FIG. 1 shows the structure of a system for enabling GC intercommunication by an intercommunication gateway in the prior art. In comparison with FIG. 3, it can be seen that the front-end processor in the CDMA short message service center only includes the C-MAP 106, an intercommunication gateway is connected between the G-Agent 104 and the C-Agent 108, and the GC intercommunication is realized by the intercommunication gateway.

Figure 2:
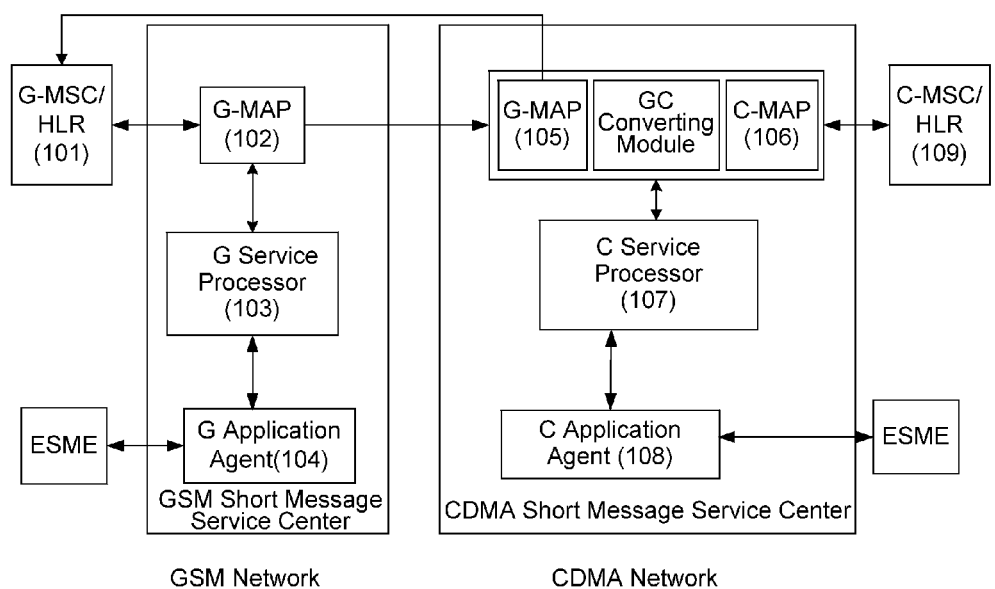
FIG. 2 is a diagram showing the structure of a system for enabling GC intercommunication by a front-end processor, in comparison with FIG. 1, a G-MAP and a GC conversion module are added in the front-end processor in the CDMA short message service center to form a GC signaling gateway with a C-MAP.

FIG. 2 shows the structure of a system for realizing a GC signaling gateway by a front-end processor in the prior art, it can be seen that, the GC intercommunication is also enabled by the NO. 7 signaling like FIG. 3, but the conversion between the GSM message and CDMA message is realized by a GC conversion module in the front-end processor of the CDMA short message service center in comparison with FIG. 3.

Figure 4:
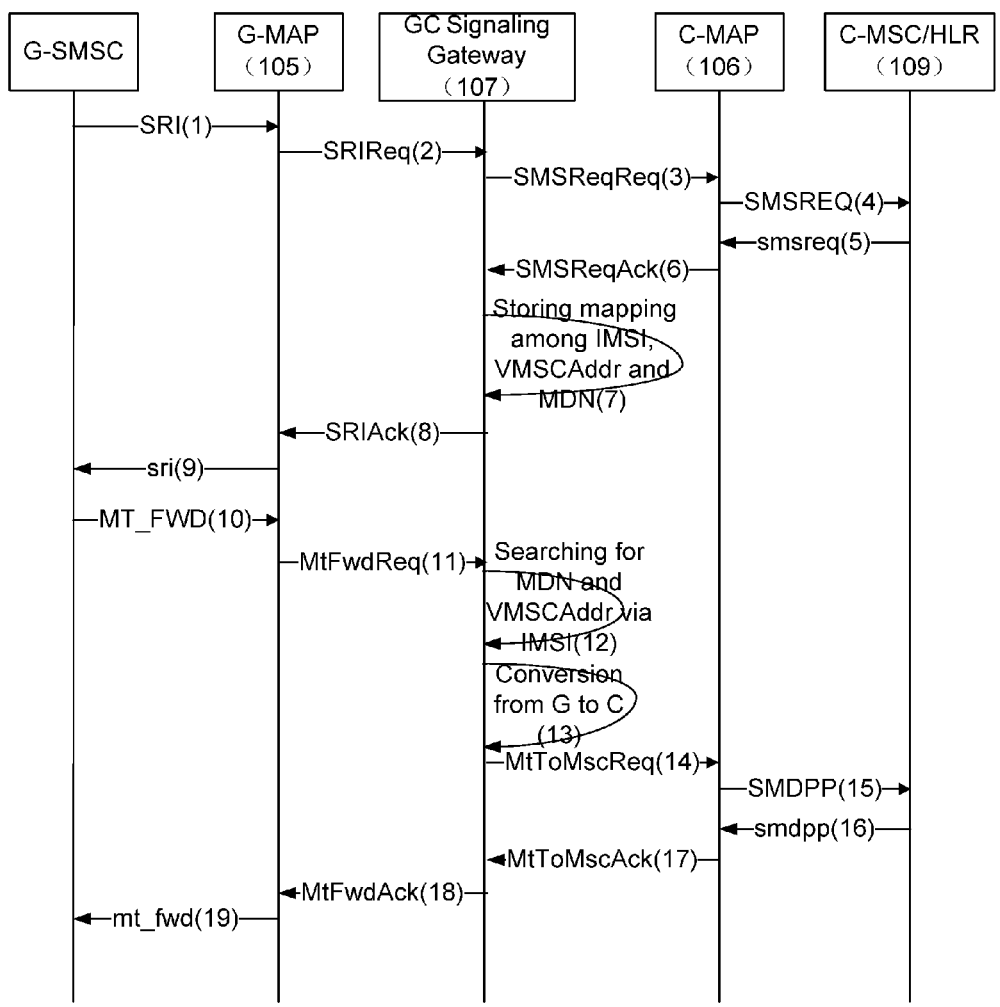
FIG. 4 shows the normal flow from a GSM subscriber to a CDMA subscriber in one embodiment of the disclosure.

FIG. 4 shows the normal flow from a GSM subscriber to a CDMA subscriber in one embodiment of the disclosure, including the following procedures:

A GSM subscriber originates a call:

The flow is the same as the originating flow at the existing GSM short message service center and the originating message includes a source number and a target number.

A GSM short message service center terminates the call:

The mobile terminated flow is the same as the mobile terminated flow at the existing GSM short message service center and the mobile terminated message includes a source number and a target number.

Routing query:

1. The service processor of the GSM short message service center (G service processor 103) sends a mobile terminated request to the G-MAP 102 of the GSM short message service center; the G-MAP 102 of the GSM short message service center determines that the target number is a CDMA network number; the global translation (GT) of the target number is oriented to a GC signaling gateway 107; the G-MAP 102 of the GSM short message service center sends the short message request routing signaling (MAP-SEND-ROUTING-INFO-FOR-SM-SRI) message of the front-end processor to the G-MAP 105 of the CDMA short message service center; and the response message is an sri message. If the target number is a GSM network number, the G-MAP 102 of the GSM short message service center will orient the GT of the target number to the HLR 101 of the GSM network and get routing query information from the G-HLR 101, which is the processing difference between the CDMA and GSM subscribers in the flow. In the flow, the GC signaling gateway 107 serves as the HLR of the CDMA subscriber in the GSM network.

2. The G-MAP 105 of the CDMA short message service center sends the internal query routing (SRIReq) messages of the front-end processor and the service processor to the GC signaling gateway 107, wherein the response message is a SRIAck message.

3. The GC signaling gateway 107 sends a target subscriber routing query information (SmsReqReq) message to the C-MAP 106, wherein the SmsReqReq message is the internal messages of the service processor and the front-end processor; and the service processor requires the front-end processor for querying routing information, wherein the response message is an SmsReqAck message.

4. The C-MAP 106 sends the routing information query signaling (SMSRequest, SMSREQ) message of the front-end processor; when the short message service center does not know the currently visited MSC of the target subscriber, the signaling needs to be sent to the C-HLR 109 of the HLR of the target subscriber to search for routing information, wherein the response message is the smsreq.

5. The C-MAP 106 receives the smsreq message returned by the C-HLR 109.

6. The GC signaling gateway 107 receives the SmsReqAck message returned by the C-MAP 106, if the MIN is returned in the SmsReqAck message, the MIN needs to be converted into the IMSI, because the GSM network identifies a subscriber by the IMSI, while the CDMA network identifies a subscriber by the IMSI or the MIN, so, if the CDMA network adopts the MIN, the MIN needs to be converted into the IMSI which is then returned to the GSM network.

7. The GC signaling gateway 107 stores in a database the mapping relationship among the MDN, VMSCAddr and IMSI.

8. The GC signaling gateway 107 returns a SRIAck message, which includes the IMSI and VMSCAddr, to the G-MAP 105 of the CDMA short message service center.

9. The G-MAP 105 of the CDMA short message service center returns an sri message to the G-SMSC of the GSM short message service center, and replaces the VMSCAddr returned by the GC signaling gateway 107 with the address of the GC signaling gateway 107.

Sending a short message:

10. The G-SMSC sends a short message mobile terminated signaling
(MAP-MT-FORWARD-SM, MT_FWD) message to the G-MAP 105 of the CDMA short message service center according to the address of the GC signaling gateway 107 returned by the sri message, and the response message is an mt_fwd message.

11. The GC signaling gateway 107 receives the mobile terminated request (MtFwdReq) message from the G-MAP 105 of the CDMA short message service center, wherein the MtFwdReq message is an internal message and includes a parameter IMSI; and the response message is the MtFwdAck message.

12. According to the stored mapping relationship, the GC signaling gateway 107 obtains the MDN and VMSCAddr according to the parameter IMSI.

13. The GC signaling gateway 107 converts a GSM message into a CDMA message.

14. The GC signaling gateway 107 sends a CDMA mobile terminated (MtToMscReq) message to the C-MAP 106, wherein the MtToMscReq message is an internal message and includes a parameter VMSCAddr; and the response message is the MtToMscAck message.

15. The C-MAP 106 sends the mobile terminated request signaling (SMSDeliveryPointToPoint, SMDPP) message of the front-end processor to the C-MSC 109 visited by the target subscriber according to the parameter VMSCAddr, wherein the response message for the SMDPP message is the smdpp message.

16. The C-MAP 106 receives the smdpp message returned by the C-MSC 109.

17. The GC signaling gateway 107 receives the MtToMscAck message returned by the C-MAP 106.

18. The G-MAP 105 of the CDMA short message service center receives the MtFwdAck message from the GC signaling gateway 107.

19. The G-MSC 101 receives the mt_fwd message from the G-MAP 105 of the CDMA short message service center.

In the normal flow, if the smsreq message fails to return the routing query in Step 5, a failure code is returned in Step 9; and the normal flow is ended.

Figure 5:
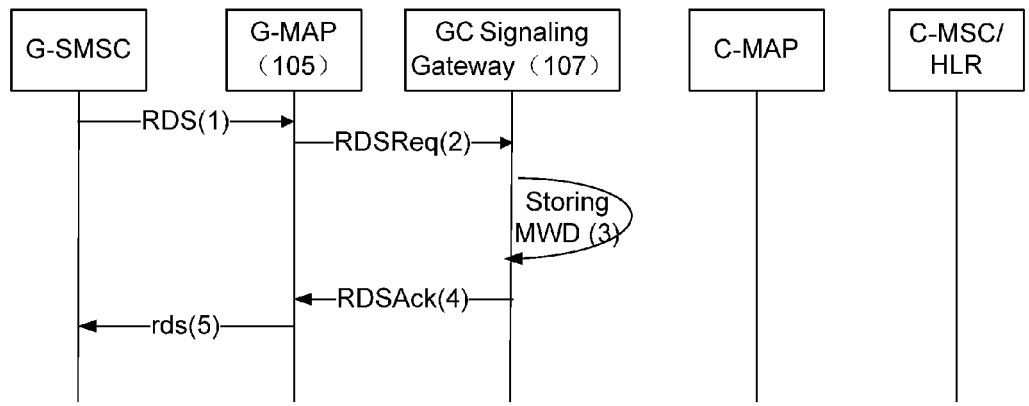
FIG. 5 shows the failure flow from a GSM subscriber to a CDMA subscriber in one embodiment of the disclosure.

FIG. 5 shows the failure flow from a GSM subscriber to a CDMA subscriber in one embodiment of the disclosure, including:

1. If the Mt fails to be sent and is stopped from retrying, as the CDMA subscriber is configured to be oriented to the GC signaling gateway 107, the G-SMSC sends a report short message delivery result signaling (MAP-REPORT-DELIVERY-STATUS, RDS) message of the front-end processor to the G-MAP 105 of the CDMA short message service center, and the response message is the rds message. The GC signaling gateway 107 serves as the HLR of a CDMA subscriber in the GSM network.

2. The G-MAP 105 of the CDMA short message service center sends a report short message delivery (RDSReq) message to the GC signaling gateway 107, wherein the RDSReq message is an internal message and includes a parameter MDN; and the response message is the RDSAck message.

3. The GC signaling gateway 107 stores the mapping relationship between the MDN and the short message service center address (scAddr) in an MWD table, the MWD table stores a target number and the address sdAddr of the short message service center of the target number where a message is waiting to be sent; and according to the address, the GC signaling gateway 107 can forward the notification message to the corresponding short message service center which is to trigger retry.

4. The GC signaling gateway 107 returns an RDSAck message to the G-MAP 105 of the CDMA short message service center.

5. The G-SMSC receives the rds message returned by the G-MAP 105 of the CDMA short message service center.

Figure 6:
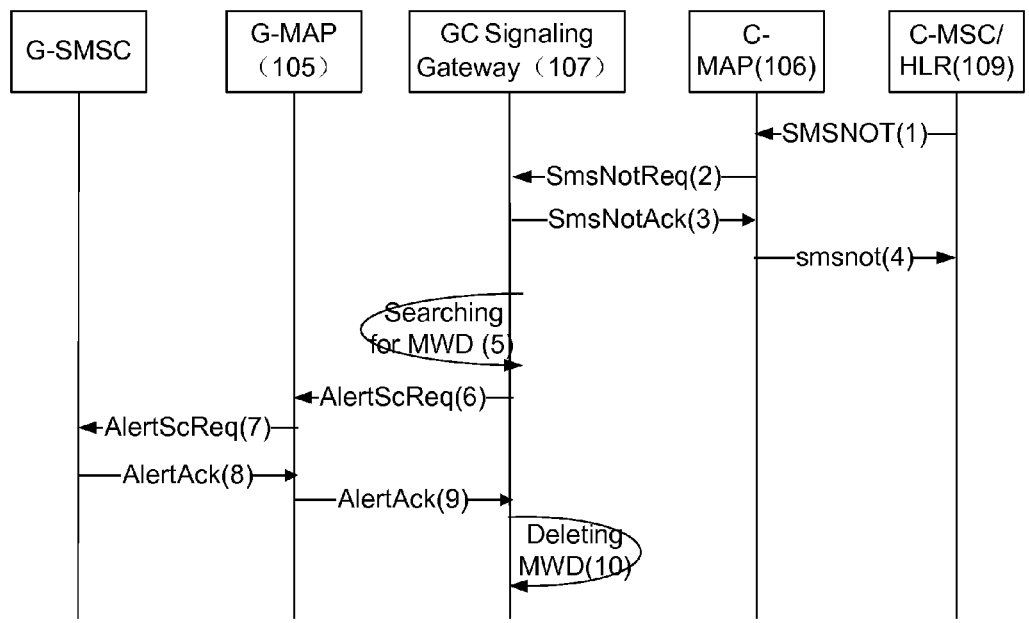
FIG. 6 shows the notification processing flow from a GSM subscriber to a CDMA subscriber in one embodiment of the disclosure.

FIG. 6 shows the notification processing flow from a GSM subscriber to a CDMA subscriber in one embodiment of the disclosure:

1. When a subscriber is in a started or an accessible state, the C-MSC/HLR 109 sends a notification message signaling (SMSNotification, SMSNOT) message to the C-MAP 106; and the MSC/HLR notifies the short message service center through the signaling to trigger retry if there is a message waiting to be sent, and the response message is the smsnot message.

2. The C-MAP 106 sends the starting notification (SmsNotReq) message for the service processor to the GC signaling gateway 107, wherein the SmsNotReq message is an internal message and the response message is the SmsNotAck message.

3. The C-MAP 106 receives the SmsNotAck message returned by the GC signaling gateway 107.

4. The C-MSC/HLR 109 receives the smsnot message from the C-MAP 106.

5. The GC signaling gateway 107 searches for the MWD table according to the MDN.

6. If a record of the MWD table is found, the GC signaling gateway 107 sends a GSM notification (AlertScReq) message to the G-MAP 105 of the CDMA short message service center, wherein the AlertScReq message is an internal message and includes a short message central address, parameter scAddr, and the response message is the AlertAck message.

7. The G-MAP 105 of the CDMA short message service center sends the AlertScReq message to the G-SMSC according to the scAddr.

8. The G-SMSC triggers retry and returns the AlertScAck message to the G-MAP 105 of the CDMA short message service center.

9. The G-MAP 105 of the CDMA short message service center returns the AlertScAck message to the GC signaling gateway 107.

10. The GC signaling gateway 107 deletes the mapping between the MDN and the scAddr in the MWD table.

Figure 7:
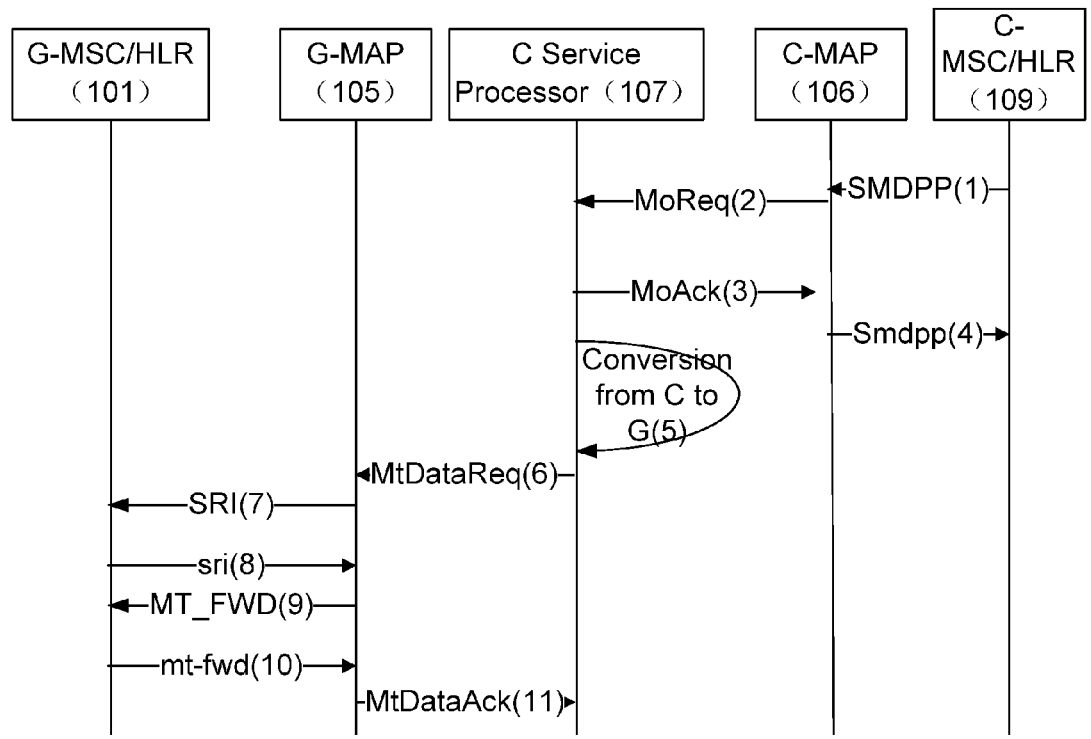
FIG. 7 shows the normal flow from a CDMA subscriber to a GSM subscriber in one embodiment of the disclosure.

FIG. 7 shows the normal flow from a CDMA subscriber to a GSM subscriber in one embodiment of the disclosure:

A CDMA subscriber originates a call:

the originating flow is the same as the existing flow, including the following procedure:

1. A CDMA subscriber sends a message; a C-MSC 109 sends an originating request signaling (SMSDeliveryPointToPoint, SMDPP) message to the C-MAP 106; and a short message service center sends a mobile terminated request signaling to an MSC or the signaling of messages is forwarded among short message service centers; the SMDPP signaling includes a source subscriber number, a target subscriber number, message contents and the like, and the response message is the smdpp message.

2. The C-MAP 106 sends an internal originating request (MoReq) message for the CDMA short message service center to the CDMA service processor (C service processor 107) to perform originating processing, wherein the MoReq message is an internal message; and the response message is the MoAck message.

3. The CDMA service processor 107 returns a MoAck message to the C-MAP 106.

4. The C-MAP 106 returns a smdpp message to the C-MSC 109.

A CDMA short message service center terminates the call:

5. For the message of the target subscriber which is a GSM subscriber, the CDMA service processor 107 converts the message into a GSM message.

6. The CDMA service processor 107 sends a GSM mobile terminated request (MtDataReq) message to the G-MAP 105 of the CDMA short message service center, wherein the MtDataReq message is an internal message and the response message is an MtDataAck message. If the target subscriber is a CDMA subscriber, the CDMA service processor 107 sends the mobile terminated message (MttoMscReq) message to the C-MAP 106; and the C-MAP 106 sends the message after performing routing query to the C-HLR 109 of the CDMA network, which is the processing difference between the GSM subscriber and the CDMA subscriber in this flow.

Routing query:

7. The G-MAP 105 of the CDMA short message service center sends an SRI message to the G-HLR 101 of the GSM network according to configuration and searches for the routing information of the target number; and the G-MAP 102 of the GSM short message service center needs to set the GT of the target subscriber to be the HLR of the GSM network.

8. The G-MAP 105 of the CDMA short message center receives the sri message returned by the G-HLR 101 of the GSM network.

Sending a message:

9. The G-MAP 105 of the CDMA short message service center directly sends an MT_FWD message to the G-MSC 101 of the GSM network visited by the target subscriber according to the routing information returned by the sri message, wherein the flow involves no GSM short message service center.

10. The G-MAP 105 of the CDMA short message center receives the mt_fwd message returned by the G-MSC 101 visited by a subscriber.

11. The CDMA service processor 107 receives the MtDataAck message returned by the G-MAP 105 of the CDMA short message service center.

Figure 8:
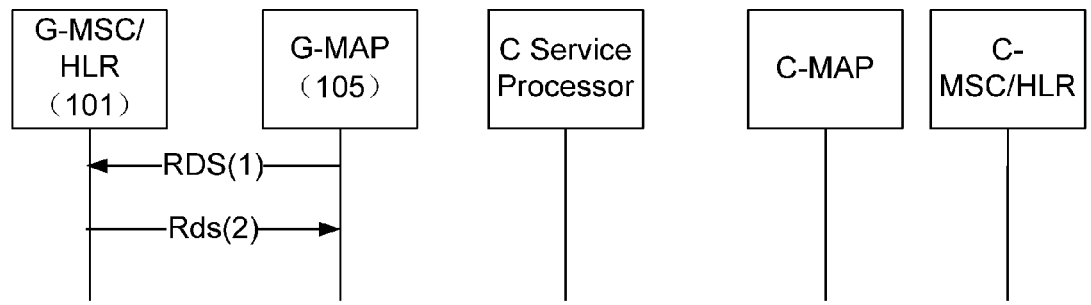
FIG. 8 shows the failure flow from a CDMA subscriber to a GSM subscriber in one embodiment of the disclosure.

FIG. 8 shows the failure flow from a CDMA subscriber to a GSM subscriber in one embodiment of the disclosure:

1. If the mobile terminating fails to be sent and is stopped from retrying, the G-MAP 105 of the CDMA short message service center sends an RDS message to the G-HLR 101 of the GSM network; and the G-HLR 101 records the address of the short message service center of the message, i.e., the address of the GC signaling gateway 107.

2. The G-MSC/HLR 101 returns the rds message to the G-MAP 105 of the CDMA short message service center.

Figure 9:
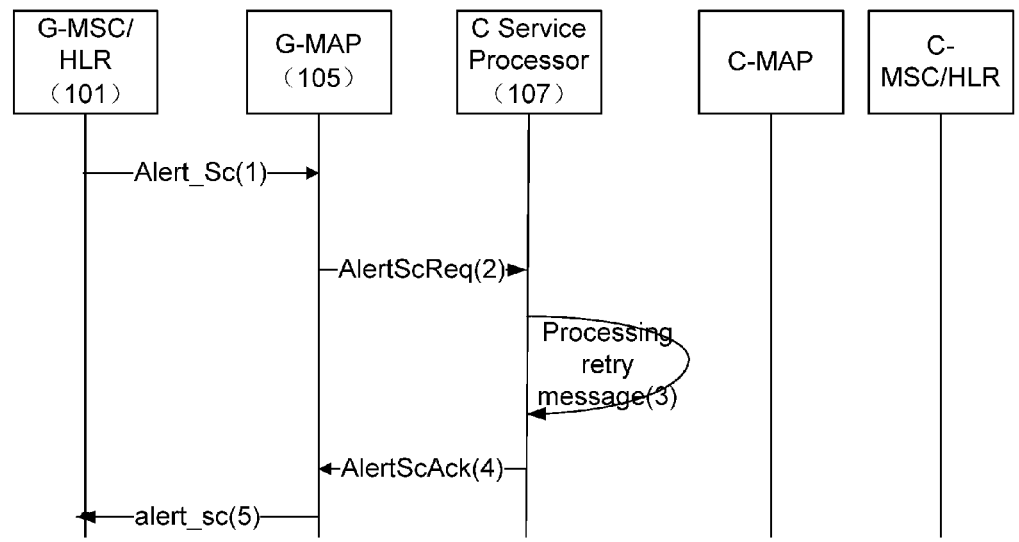
FIG. 9 shows the notification processing flow from a CDMA subscriber to a GSM subscriber in one embodiment of the disclosure.

FIG. 9 shows the notification processing flow from a CDMA subscriber to a GSM subscriber in one embodiment of the disclosure:

1. The G-MSC/HLR 101 triggers the GSM MAP notification signaling (MAP-ALERT-SERVICE-CENTER, Alert_Sc) message and sends it to the G-MAP 105 of the CDMA short message service center according to the recorded address of the short message service center, wherein the response message is the alert_sc message. The address of the short message service center recorded by the G-HLR 101 is the address of the GC signaling gateway 107.

2. The CDMA service processor 107 receives the GSM notification (AlertScReq) message from the G-MAP 105 of the CDMA short message service center, wherein the AlertScReq message is an internal message and the response message is the AlertScAck message.

3. The CDMA service processor 107 processes the retry message.

4. The CDMA service processor 107 returns the AlertScAck message to the G-MAP 105 of the CDMA short message service center.

5. The G-MSC/HLR 101 receives the Alert_Sc message from the G-MAP 105 of the CDMA short message service center.

In order to compare the difference between the implementation of the GC signaling gateway by the front-end processor and the embodiment of the disclosure, FIG. 10 to FIG. 14 describe the flow of implementing the GC signaling gateway by the front-end processor. It should be noted that the GC signaling gateway is implemented by the front-end processor in the realization implementation of the front-end processor, i.e, the GC signaling gateway is the integrated module consisting of a G-MAP 105, a GC conversion module and a C-MAP 106 shown in FIG. 2.

Figure 10:
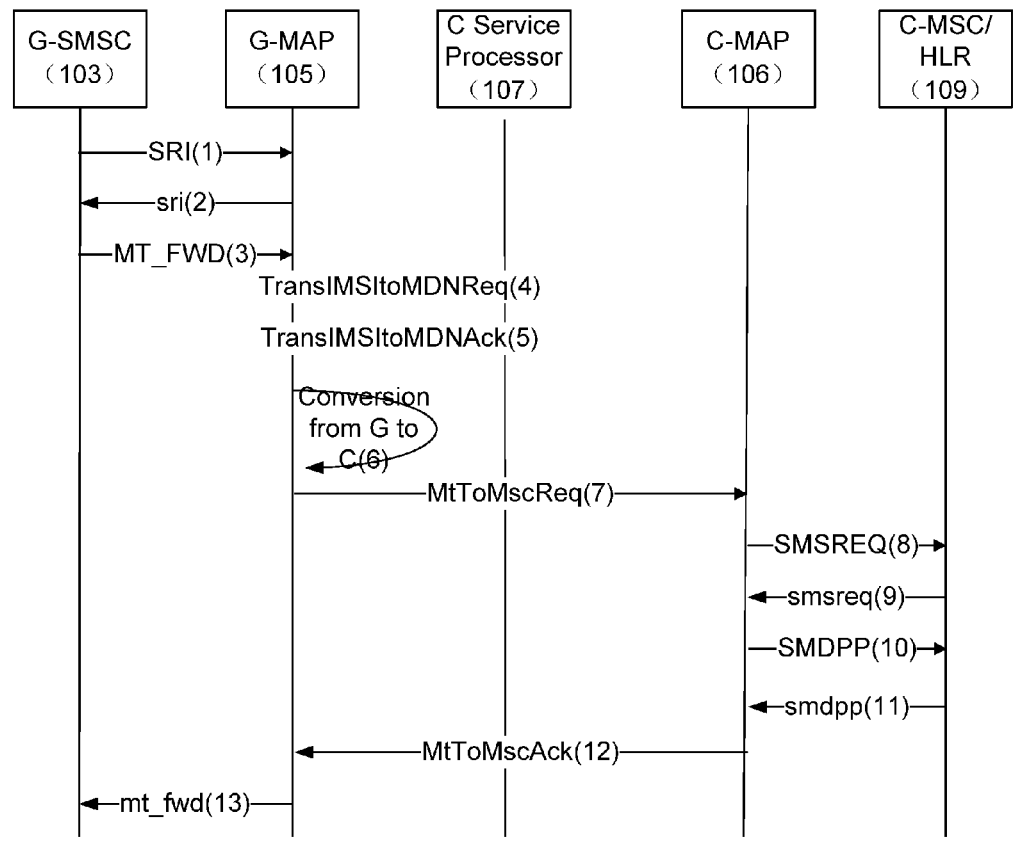
FIG. 10 shows the normal flow from a GSM subscriber to a CDMA subscriber of a GS signaling gateway implemented by a front-end processor.

FIG. 10 shows the normal flow from a GSM subscriber to a CDMA subscriber of a GS signaling gateway implemented by a front-end processor:

A GSM subscriber originates a call:

the flow is the same as the originating flow at the existing GSM short message service center and the originating message includes a source number and a target number.

A GSM short message service center terminates the call:

the mobile terminated flow is the same as the mobile terminated flow at the existing GSM short message service center and the mobile terminated message includes a source number and a target number.

Routing query:

1. The service processor 103 of the GSM short message service center sends a mobile terminated request to the G-MAP 102 of the GSM short message service center; when determining that the target number is a CDMA network number, the G-MAP 102 of the GSM short message service center orients the GT of the target number to the GC signaling gateway and sends an SRI message to the G-MAP 105 of the GC signaling gateway. If the target number is a GSM network number, the G-MAP 102 of the GSM short message service center will orient the GT of the target number to the G-HLR 101 of the GSM network and search for routing information at the G-HLR 101, which is the processing difference between the CDMA and GSM subscribers in the flow. In the flow, the GC signaling gateway serves as the HLR of the CDMA subscriber in the GSM network.

2. The G-MAP 105 of the GC signaling gateway directly returns an sri message, which includes the address of the GC signaling gateway, to the G-SMSC.

Sending a message:

3. The G-SMSC sends the MT_FWD message to the G-MAP 105 of the GC signaling gateway according to the address of the GC signaling gateway returned by the sri message.

4. The G-MAP 105 of the GC signaling gateway receives the MtFwdReq message, sends a searching for MDN number via IMSI request (TransIMSItoMDNReq) message to the CDMA service processor 107, and requires the CDMA service processor 107 to return the MDN number corresponding to the IMSI, wherein the service processor needs to support the target subscriber to create account and can search for the MDN via the IMSI, and the response message is the TransIMSItoMDNAck message.

5. The CDMA service processor 107 returns the TransIMSItoMDNAck message, which includes the MDN of the target number, to the G-MAP 105 of the GC signaling gateway.

6. The G-MAP 105 of the GC signaling gateway calls the conversion function of the GC conversion module and converts the GSM message into the CDMA message.

7. The G-MAP 105 of the GC signaling gateway sends the MtToMscReq message to the C-MAP 106 of the GC signaling gateway.

8. The C-MAP 106 of the GC signaling gateway sends the SMSREQ message to the C-HLR 109 to search for routing information.

9. The C-MAP 106 of the GC signaling gateway receives the smsreq message returned by the C-HLR 109.

10. The C-MAP 106 of the GC signaling gateway sends the SMDPP message to the C-MSC 109 visited by the target subscriber.

11. The C-MAP 106 of the GC signaling gateway receives the smdpp message returned by the C-MSC 109.

12. The G-MAP 105 of the GC signaling gateway receives the MtToMscAck message returned by the C-MAP 106 of the GC signaling gateway.

In Step 2 of the flow, the target subscriber sent to the GC signaling gateway defaults to be the CDMA network subscriber; if the target subscriber is not the CDMA network subscriber, the mobile terminating of the CDMA network will fail.

In Step 4, the IMSI is necessary for searching for the MDN number, therefore, all the CDMA target subscribers are required to create account and be provided with the IMSI, which does not conform to the habits of the international operators.

In Step 7, the G-MAP 105 of the GC signaling gateway sends the MtToMscReq message to the C-MAP 106 of the GC signaling gateway, while the MtToMscReq message should be sent to the C-MAP 106 by the CDMA service processor 107.

Figure 11:
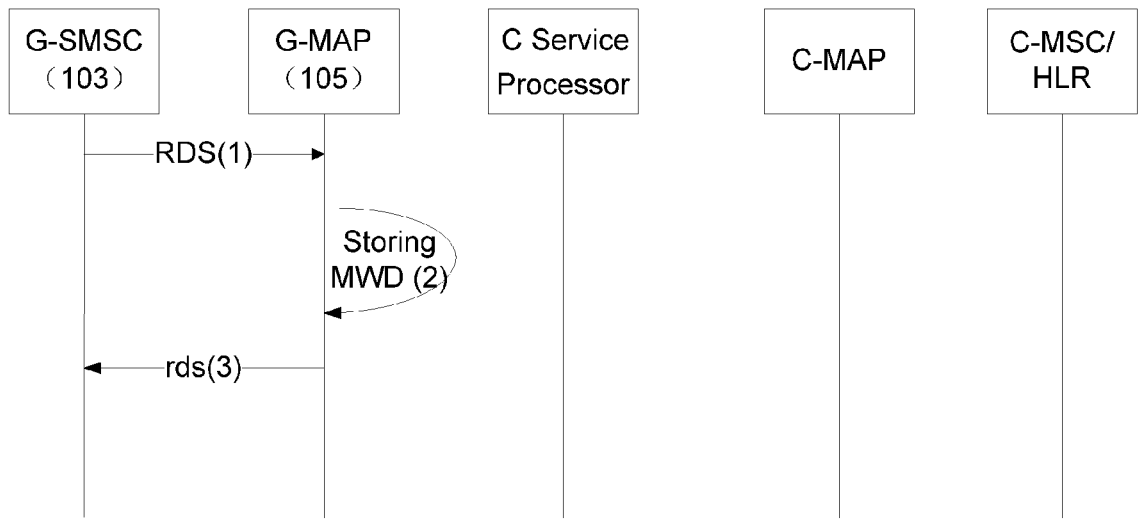
FIG. 11 shows the failure flow from a GSM subscriber to a CDMA subscriber of a GS signaling gateway implemented by a front-end processor.

FIG. 11 shows the failure flow from a GSM subscriber to a CDMA subscriber of a GS signaling gateway implemented by a front-end processor:

1. If the mobile terminating fails to be sent and is stopped from retrying, since the CDMA subscriber is configured to be oriented to the GC signaling gateway, the G-SMSC sends an RDS message to the G-MAP 105 of the GC signaling gateway.

2. The G-MAP 105 of the GC signaling gateway directly stores the MWD data in the MWD table.

3. The G-SMSC receives the rds message returned by the G-MAP 105 of the GC signaling gateway.

Figure 12:
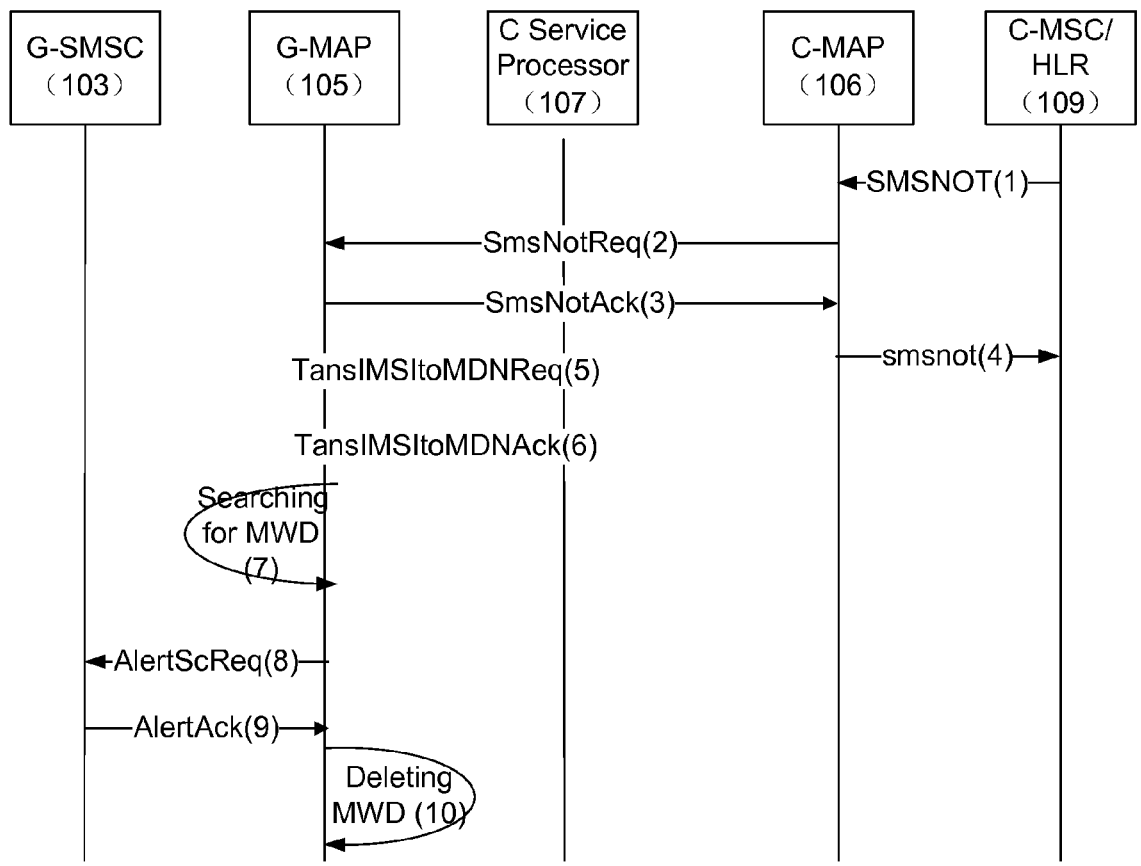
FIG. 12 shows the notification processing flow from a GSM subscriber to a CDMA subscriber of a GS signaling gateway implemented by a front-end processor.

FIG. 12 shows the notification processing flow from a GSM subscriber to a CDMA subscriber of a GS signaling gateway implemented by a front-end processor:

1. C-MSC/HLR 109 sends the SMSNOT message to the C-MAP 106 of the GC signaling gateway.

2. The C-MAP 106 of the GC signaling gateway sends the SmsNotReq message to the G-MAP 105 of the GC signaling gateway.

3. The C-MAP 106 of the GC signaling gateway receives the SmsNotAck message returned by the G-MAP 105 of the GC signaling gateway.

4. The C-MSC/HLR 109 receives the smsnot message from the C-MAP 106 of the GC signaling gateway.

5. The G-MAP 105 of the GC signaling gateway sends the TransIMSItoMDNReq message to the CDMA service processor 107.

6. The CDMA service processor 107 returns the TransIMSItoMDNAck message to the G-MAP 105 of the GC signaling gateway.

7. The G-MAP 105 of the GC signaling gateway searches for the MWD table according to the MDN.

8. If a record of the MWD table can be found, the G-MAP 105 of the GC signaling gateway sends the AlertScReq message to the G-SMSC, wherein the message includes parameter scAddr, and the GSM short message service center corresponding to the scAddr address triggers retry.

9. The G-SMSC triggers retry and returns the AlertScAck message to the G-MAP 105 of the GC signaling gateway.

10. The G-MAP 105 of the GC signaling gateway deletes the mapping between the MDN and scAddr in the MWD.

The difference between the flow and the flow in FIG. 6 is that the MWD is stored in a front-end processor module, in Step 2, the C-MAP 106 of the GC signaling gateway sends the SmsNotReq message to the G-MAP 105 of the GC signaling gateway, while the SmsNotReq message should be sent from the C-MAP 106 to the CDMA service processor 107.

Figure 13:
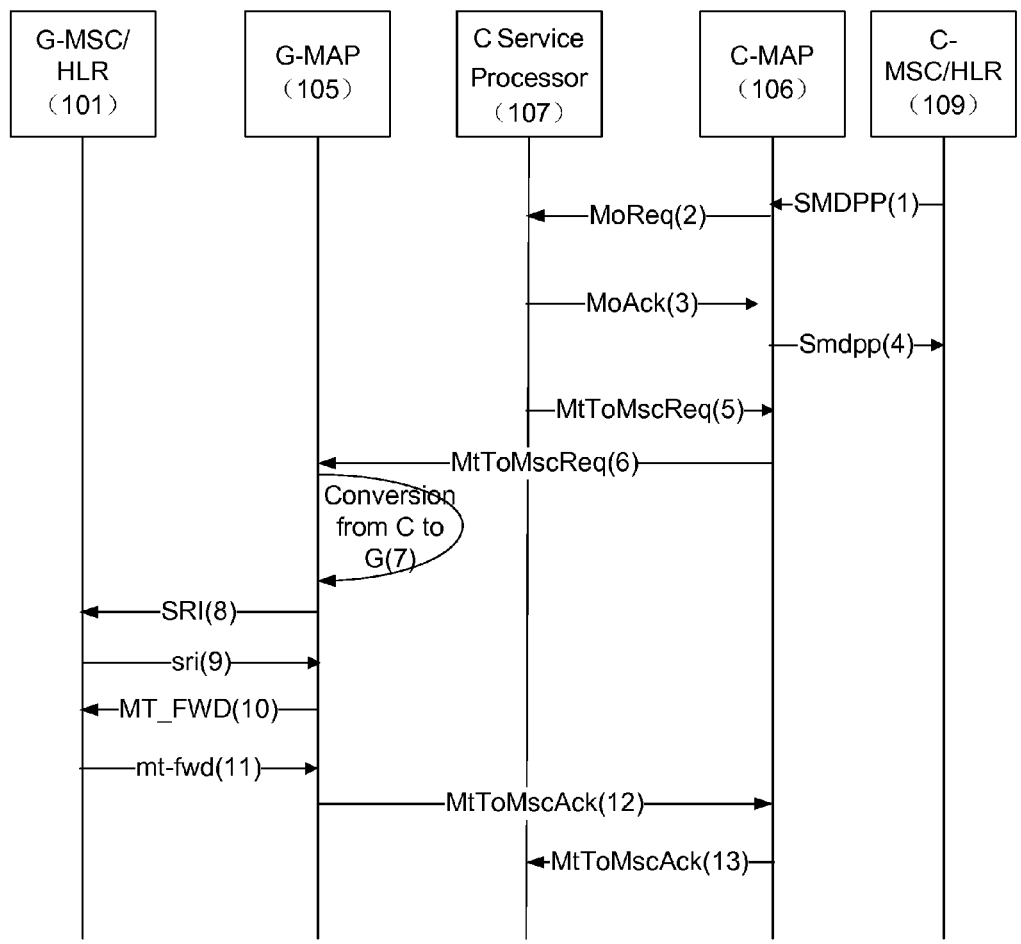
FIG. 13 shows the normal flow from a CDMA subscriber to a GSM subscriber of a GS signaling gateway implemented by a front-end processor.

FIG. 13 shows the normal flows from a CDMA subscriber to a GSM subscriber of a GS signaling gateway implemented by a front-end processor:

A CDMA subscriber originates a call:

the originating flow is the same as the existing flow, including the following procedures:

1. A CDMA subscriber sends a message; the C-MSC 109 sends an SMDPP message to the C-MAP 106, which is an originating message.

2. The CDMA service processor 107 receives the internal originating request (MoReq) message for the CDMA short message service center from the C-MAP 106, and then performs originating process, wherein the MoReq message is an internal message; and the response message is a MoAck message.

3. The CDMA service processor 107 returns the MoAck message to the C-MAP 106.

4. The C-MAP 106 returns the smdpp message to the C-MSC 109.

A CDMA short message service center terminates the call:

5. The CDMA service processor 107 sends the MttoMscReq message to the C-MAP 106 of the GC signaling gateway, and adding a particular field identifier to the message when the target subscriber is a GSM subscriber.

6. The C-MAP 106 of the GC signaling gateway determines that the target subscriber is the GSM subscriber according to the particular field identifier and forwards the MttoMscReq message to the G-MAP 105 of the GC signaling gateway. If the target subscriber is a CDMA subscriber, the C-MAP 106 sends routing query to the C-HLR 109 to obtain a routing and then sends the obtained routing.

7. The G-MAP 105 of the GC signaling gateway calls the conversion function of the GC conversion module to convert the CDMA message into the GSM message.

Routing query:

8. The G-MAP 105 of the GC signaling gateway sends the SRI message to the G-HLR 101 of the GSM network to search for the routing information of the target number.

9. The G-MAP 105 of the GC signaling gateway receives the sri message returned by the G-HLR 101.

Sending a message:

10. The G-MAP 105 of the GC signaling gateway directly sends an MT_FWD message to the G-MSC 101 of the GSM network visited by the target subscriber according to the routing information returned by the sri.

11. The G-MAP 105 of the GC signaling gateway receives the mt_fwd message returned by the G-MSC 101 visited by a subscriber.

12. The C-MAP 106 of the GC signaling gateway receives the MttoMscAc message returned by the G-MAP 105 of the GC signaling gateway.

13. The CDMA service processor 107 receives the MttoMscAc message.

The difference between the flow and the flow in FIG. 7 is that: in Step 6, the C-MAP 106 of the GC signaling gateway receives the MttoMscReq message of the service processor, then forwards the MttoMscReq message to the G-MAP 105 of the GC signaling gateway; generally, the C-MAP 106 should perform routing query and then terminate the call after receiving the MttoMscReq message of the service processor; in the implementation, the C-MAP 106 sends the MttoMscReq message to the G-MAP 105 of the GC signaling gateway; the G-MAP 105 needs to process the MttoMscReq message; and a large modification is made in order to realize the GC signaling gateway function.

The failure flow from a CDMA subscriber to a GSM subscriber of a GS signaling gateway implemented by a front-end processor is the same as that in FIG. 8.

Figure 14:
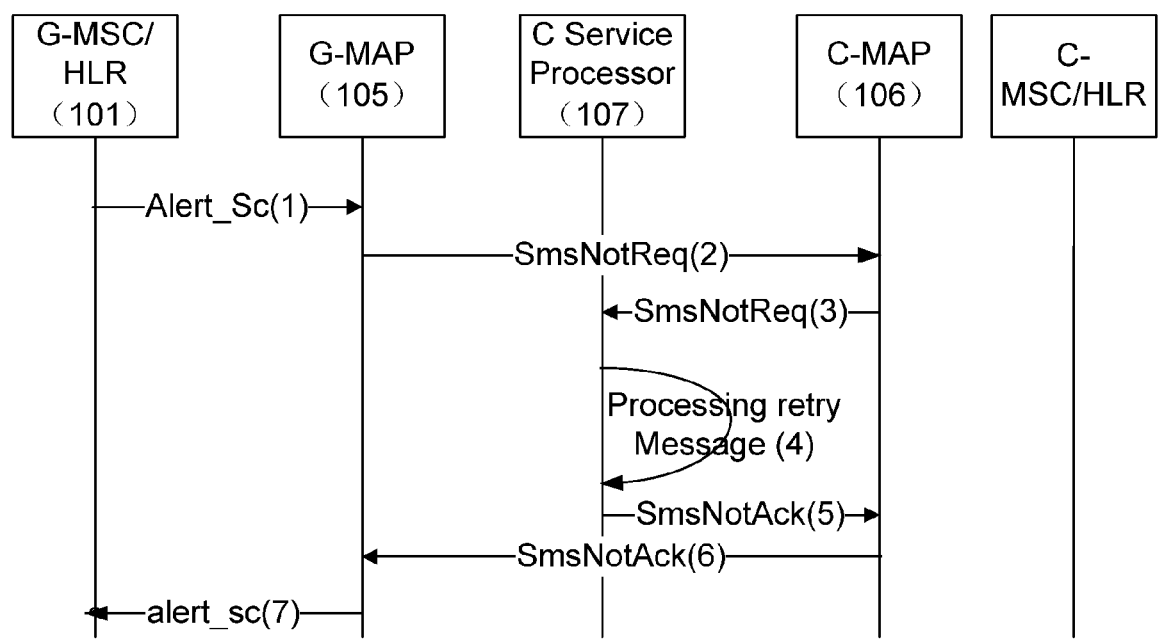
FIG. 14 shows the notification processing flow from a CDMA subscriber to a GSM subscriber of a GS signaling gateway implemented by a front-end processor.

FIG. 14 shows the notification processing flow from a CDMA subscriber to a GSM subscriber of a GS signaling gateway implemented by a front-end processor:

1. When the target subscriber is in a started or an accessible state, the G-MSC/HLR 101 triggers the Alert_Sc message according to the recorded address of the short message service center, and sends the message to the G-MAP 105 of the GC signaling gateway, wherein the address of the short message service center recorded by the HLR is the address of the GC signaling gateway.

2. The G-MAP 105 of the GC signaling gateway sends the SmsNotReq message to the C-MAP 106 of the GC signaling gateway after receiving the Alert_Sc message.

3. The G-MAP 106 of the GC signaling gateway sends the SmsNotReq message to the CDMA service processor 107.

4. The CDMA service processor 107 processes the retry message.

5. The CDMA service processor 107 returns the SmsNotAck message to the C-MAP 106 of the GC signaling gateway.

6. The C-MAP 106 of the GC signaling gateway returns the SmsNotAck message to the G-MAP 105 of the GC signaling gateway.

7. The G-MAP 105 of the GC signaling gateway returns the Alert_Sc message to the G-MSC 101.

The difference between the flow and that in FIG. 9 is that: after receiving the Alert_Sc message of the G-MSC/HLR 101, the G-MAP 105 of the GC signaling gateway converts the Alert_Sc message into the SmsNotReq message which is sent to the C-MAP 106; then, the C-MAP 106 sends the SmsNotReq message to a service processor; generally, the C-MAP 106 should send the SMSNOT to the C-MAP 106 after receiving the notification message of the MSC/HLR, and then the C-MAP 106 sends the SmsNotReq message to the service processor; and in order to realize the GC signaling gateway function, a large modification is made.

Comparing with the GC signaling gateway implemented by a front-end processor, the GC signaling gateway of the disclosure which is implemented by a service processor has obvious advantages.

The front-end processor runs on single boards each having a limited processing capacity, so the processing capacity of the front-end processor can be only improved by physically increasing the amount of the single boards; and if one frame cannot meet the requirement, frames also need to be added, so the expansion is inconvenient. While the service processor runs on a mini computer which has a much greater processing capacity than that of the single board, so that the expansion is convenient.

In addition, due to the limited memory of the front-end processor, it is necessary to particularly allocate a memory for storing MWD data in order to realize the function of the GC signaling gateway, which affects the performance of the front-end processor. The front-end processor should be only in charge of signaling forwarding; however, in the implementation of the front-end processor for implementing the GC signaling gateway, the front-end processor also needs to perform many service processes, such as converting a GC message, converting the MIN into the IMSI, converting a GC error code and the like, which increases the complexity of the front-end processor and affects the processing capacity of the front-end processor. However, the service processor has rich memory resources, so the resources for storing the MWD data have a little influence on the service processor; and it is basically in charge of processing services, so the service processing functions, such as converting the GC message, converting the MIN into the IMSI, and converting the GC error code, are easy and convenient to add and realize, and more suitable for the functional difference between the front-end processor and the service processor.

In term of signaling, in the implementation of the front-end processor, the G-MAP 105 needs to send the MttoMscReq message to the C-MAP 106 (Step 7 in FIG. 10), and process the SmsNotReq message from the C-MAP 106 (Step 2 in FIG. 12). Meanwhile, the C-MAP 106 needs to send the MttoMscReq message of the service processor to the G-MAP 105 (Step 6 in FIG. 13), and process the SmsNotReq message from the G-MAP 105 (Step 2 in FIG. 14); these flows are the changes made to meet the implementation requirement of the front-end processor and not conform to practices; and the signaling which should be interacted between the service processor and the front-end processor is changed to be interacted between two modules of the front-end processor, which causes the chaos of the signaling. The disclosure can well prevent the messages between the G-MAP 105 and C-MAP 106 from directly interacting so as to better conform to the signaling specification, and make the flows more rational and the services control more flexible.

Besides, the way of implementing the GC signaling gateway by the service processor also meets the requirements of international operators to enable the GC intercommunication by the NO. 7 signaling.

What described above is the further description of the disclosure with reference to specific preferred embodiments and is only the examples for the understanding of the disclosure; and the detailed embodiments of the disclosure should not be limited to them. Various possible equivalent changes or replacements may be made by those skilled in the art within the concept of the disclosure and shall fall within the protection scope of the disclosure.

INDUSTRIAL APPLICABILITY

Compared with the GC signaling gateway implemented by a front-end processor, the GC signaling gateway of the disclosure which is implemented by a service processor has obvious advantages. The front-end processor runs on single boards each having a limited processing capacity, so the processing capacity of the front-end processor can be only improved by physically increasing the amount of the single boards; and if one frame cannot meet the requirement, frames also need to be added, so the expansion is inconvenient. In addition, due to the limited memory of the front-end processor, it is necessary to particularly allocate a memory for storing MWD data in order to realize the function of the GC signaling gateway, which affects the performance of the front-end processor. The front-end processor should be only in charge of signaling forwarding; however, in the implementation of the front-end processor for implementing the GC signaling gateway, the front-end processor also needs to perform many service processes, such as converting a GC message, converting the MIN into the IMSI, converting a GC error code and the like, which increases the complexity of the front-end processor. The disclosure implements the GC signaling gateway by a service processor to better solve the problem in the implementation of the front-end processor; the service processor runs on a mini computer which has a much greater processing capacity than that of the single boards; and the resources for storing the MWD data also have a little influence on the service processor. Besides, the way of implementing the GC signaling gateway by the service processor also meets the requirements of international operators to enable the GC intercommunication by the NO. 7 signaling.

The invention claimed is:

1. A method for enabling a message intercommunication between a Global System for Mobile Communications (GSM) network and a Code Division Multiple Access (CDMA) network, comprising:
   setting a GSM-CDMA (GC) signaling gateway in a service processor of a CDMA short message service center;
   during processing a message from the GSM network to the CDMA network, sending, by a GSM short message service center, a mobile terminated request message to the GC signaling gateway; converting, by the GC signaling gateway, a GSM message into a CDMA message according to the mobile terminated request message and sending the converted CDMA message to a target CDMA subscriber; and
   during processing a message from the CDMA network to the GSM network, converting, by a CDMA service processor, a CDMA message into a GSM message and sending the converted GSM message to a target GSM subscriber;
   wherein the process of processing a message from the GSM network to the CDMA network comprises successively a routing query stage and a message sending stage,
   in the routing query stage, the GSM short message service center sends a mobile terminated request message to the GC signaling gateway, the GC signaling gateway performs routing query according to the information of the target CDMA subscriber in the mobile terminated request message to obtain a routing query result, and
   in the message sending stage, the GC signaling gateway converts the GSM message into the CDMA message and sends the converted CDMA message to the target CDMA subscriber according to the routing query result.

2. The method according to claim 1, wherein
   in the routing query stage, the GC signaling gateway sends a routing query of the target CDMA subscriber to the home location register of the CDMA network according to the information of the target CDMA subscriber in the mobile terminated request message, and establishes and stores a mapping relationship among a Mobile Directory Number (MDN), a Visit Mobile Switching Center address (VMSCAddr) and an International Mobile Subscriber Identifier (IMSI) of the GSM network according to a routing query result; and
   in the message sending stage, the GC signaling gateway obtains, according to the mapping relationship, the MDN and VMSCAddr according to a parameter IMSI in the GSM message from the GSM network, converts the GSM message into the CDMA message and sends the converted CDMA message to the target CDMA subscriber.

3. The method according to claim 2, wherein the process of processing a message from the GSM network to the CDMA network comprises the following normal flow:
   AA1, the GSM short message service center sends a short message request routing signaling (SRI) message of a front-end processor to a GSM front-end processor of the CDMA network;
   AA2, the GSM front-end processor of the CDMA network receives the SRI message, and sends to the GC signaling gateway an internal routing query (SRIReq) message of a front-end processor and a service processor;
   AA3, the GC signaling gateway receives the SRIReq message, sends a target subscriber routing information query (SmsReqReq) message to the CDMA front-end processor to search for the routing information of the target subscriber;
   AA4, the CDMA front-end processor receives the SmsReqReq message, then sends the routing information signaling query (SMSREQ) message of the front-end processor to the home address location register of the CDMA network to search for the routing information of the target subscriber, and returns a target subscriber routing information query response (SmsReqAck) message to the GC signaling gateway after receiving the routing information signaling query response (smsreq) message of the front-end processor from the home address location register of the CDMA network;
   AA5, the GC signaling gateway receives the SmsReqAck message, if the SmsReqAck message includes a Mobile Identification Number (MIN) of the CDMA network, the MIN is converted into the IMSI of the GSM network, and the mapping relationship among the MDN, VMSCAddr and the IMSI is stored;
   AA6, the GC signaling gateway returns the SRI response (SRIAck) message, which includes the IMSI and VMSCAddr, to the GSM front-end processor of the CDMA network;
   AA7, the GSM front-end processor of the CDMA network receives the SRIAck message and returns the SRI response (sri) message, in which a GC signaling gateway address instead of the VMSCAddr returned by the GC signaling gateway is included, to the GSM short message service center;

AA8, the GSM short message service center sends a short message mobile terminated signaling (MT_FWD) message to the GSM front-end processor of the CDMA network according to the GC signaling gateway address included in the sri message;

AA9, after receiving the MT_FWD message, the GSM front-end processor of the CDMA network sends a mobile terminated request (MtFwdReq) message, which includes the IMSI, to the GC signaling gateway;

AA10, according to the mapping relationship among the MDN, VMSCAddr and the IMSI, the GC signaling gateway obtains the MDN and VMSCAddr according to the IMSI, and converts the GSM message into the CDMA message;

AA11, the GC signaling gateway sends a CDMA mobile terminated (MtToMscReq) message, which includes the VMSCAddr, to the CDMA front-end processor;

AA12, the CDMA front-end processor sends a mobile terminated request signaling (SMDPP) message of the front-end processor to the mobile switching center of the CDMA network visited by the target subscriber according to the VMSCAddr; and returns a CDMA mobile terminated message response (MtToMscAck) message to the GC signaling gateway after receiving the SMDPP message response (smdpp) message returned by the mobile switching center of the CDMA network;

AA13, after receiving the MtToMscAck message, the GC signaling gateway returns the mobile terminated request message response (MtFwdAck) message to the GSM front-end processor of the CDMA network;

AA14, after receiving the MtFwdAck message, the GSM front-end processor of the CDMA network returns the short message mobile terminated signaling message response (mt_fwd) message to the mobile switching center of the GSM network; and AA15, the mobile switching center of the GSM network receives the mt_fwd message, with the flow ended.

4. The method according to claim 3, wherein
if the smsreq message received by the CDMA front-end processor in the Step AA4 includes failure of the routing query, the sri message returned by the GSM front-end processor of the CDMA network to the GSM short message service center in the Step AA7 includes a failure code, and the flow ends.

5. The method according to claim 4, wherein the process of processing a message from a GSM network to a CDMA network comprises the following failure flow:

AB1, If the mobile terminating fails to be sent and is stopped from retrying, the GSM short message service center sends a report short message delivery result signaling (RDS) message of a front-end processor to the GSM front-end processor of the CDMA network;

AB2, the GSM front-end processor of the CDMA network receives the RDS message and sends the report short message delivery (RDSReq) message, which includes the MDN, to the GC signaling gateway;

AB3, the GC signaling gateway stores the mapping relationship between the MDN and the short message service center address scAddr in an MWD table and returns an RDS message response (RDSAck) message to the GSM front-end processor of the CDMA network; and the GSM front-end processor of the CDMA network returns an RDS response (rds) message to the GSM short message service center after receiving the RDSAck message; and AB4, the GSM short message service center receives the rds message, with the flow ended.

6. The method according to claim 5, wherein the process of processing a message from a GSM network to a CDMA network comprises the following notification flow:

AC1, the mobile switching center of the CDMA network sends a notification message signaling (SMSNOT) message to the CDMA front-end processor;

AC2, the CDMA front-end processor sends a start notification (SmsNotReq) message to the GC signaling gateway after receiving the SMSNOT message; and the GC signaling gateway returns the start notification message response (SmsNotAck) message to the CDMA front-end processor;

AC3, after receiving the SmsNotAck message, the CDMA front-end processor sends a notification message signaling response (smsnot) message to the mobile switching center of the CDMA network;

AC4, the GC signaling gateway searchs for the MWD table according to the MDN, and sends a GSM notification (AlertScReq) message, which includes a short message service center address scAddr, to the GSM front-end processor of the CDMA network if a record can be found;

AC5, the GSM front-end processor of the CDMA network sends the AlertScReq message to the GSM short message service center according to the scAddr;

AC6, the GSM short message service center triggers retry and returns the GSM notification message response (AlertScAck) message to the GSM front-end processor of the CDMA network;

AC7, after receiving the AlertScAck message, the GSM front-end processor of the CDMA network returns the AlertScAck message to the GC signaling gateway; and AC8, after receiving the AlertScAck message, the GC signaling gateway deletes the mapping between the MDN and scAddr in the MWD table, with the flow ended.

7. The method according to claim 3, wherein the process of processing a message from a GSM network to a CDMA network comprises the following failure flow:

AB1, If the mobile terminating fails to be sent and is stopped from retrying, the GSM short message service center sends a report short message delivery result signaling (RDS) message of a front-end processor to the GSM front-end processor of the CDMA network;

AB2, the GSM front-end processor of the CDMA network receives the RDS message and sends the report short message delivery (RDSReq) message, which includes the MDN, to the GC signaling gateway;

AB3, the GC signaling gateway stores the mapping relationship between the MDN and the short message service center address scAddr in an MWD table and returns an RDS message response (RDSAck) message to the GSM front-end processor of the CDMA network; and the GSM front-end processor of the CDMA network returns an RDS response (rds) message to the GSM short message service center after receiving the RDSAck message; and AB4, the GSM short message service center receives the rds message, with the flow ended.

8. The method according to claim 7, wherein the process of processing a message from a GSM network to a CDMA network comprises the following notification flow:

AC1, the mobile switching center of the CDMA network sends a notification message signaling (SMSNOT) message to the CDMA front-end processor;

AC2, the CDMA front-end processor sends a start notification (SmsNotReq) message to the GC signaling gateway after receiving the SMSNOT message; and the GC signaling gateway returns the start notification message response (SmsNotAck) message to the CDMA front-end processor;

AC3, after receiving the SmsNotAck message, the CDMA front-end processor sends a notification message signaling response (smsnot) message to the mobile switching center of the CDMA network;

AC4, the GC signaling gateway searchs for the MWD table according to the MDN, and sends a GSM notification (AlertScReq) message, which includes a short message service center address scAddr, to the GSM front-end processor of the CDMA network if a record can be found;

AC5, the GSM front-end processor of the CDMA network sends the AlertScReq message to the GSM short message service center according to the scAddr;

AC6, the GSM short message service center triggers retry and returns the GSM notification message response (AlertScAck) message to the GSM front-end processor of the CDMA network;

AC7, after receiving the AlertScAck message, the GSM front-end processor of the CDMA network returns the AlertScAck message to the GC signaling gateway; and AC8, after receiving the AlertScAck message, the GC signaling gateway deletes the mapping between the MDN and scAddr in the MWD table, with the flow ended.

9. The method according to claim 1, wherein the process of processing a message from the CDMA network to the GSM network comprises: a CDMA service processor converting a CDMA message into a GSM message, and sends the GSM message to the GSM front-end processor of the CDMA network; and the GSM front-end processor of the CDMA network performs routing query and sends the GSM message to a target GSM subscriber.

10. The method according to claim 9, wherein the process of processing a message from a CDMA network to a GSM network comprises the following normal flow:

BA1, the CDMA front-end processor receives the SMDPP message from the mobile switching center of the CDMA network and sends the internal originating request (MoReq) message of the CDMA short message service center to the CDMA service processor;

BA2, after receiving the MoReq message, the CDMA service processor performs originating process and returns the MoReq message response (MoAck) message to the CDMA front-end processor;

BA3, after receiving the MoAck message, the CDMA front-end processor returns the smdpp message to the mobile switching center of the CDMA network;

BA4, for the message of a target subscriber which is a GSM, the CDMA service processor converts the message into a GSM message and sends a GSM mobile terminated request (MtDataReq) message to the GSM front-end processor of the CDMA network;

BA5, the GSM front-end processor of the CDMA network sends an SRI message to the home location register of the GSM network according to the configuration to search for the routing information of a target number; and the home location registor of the GSM network returns an sri message to the GSM front-end processor of the CDMA network;

BA6, the GSM front-end processor of the CDMA network returns routing information according to the sri message and directly sends an MT_FWD message to the mobile switching center of the GSM network visited by the target subscriber; and the mobile switching center of the GSM network visited by the target subscriber returns an mt_fwd message to the GSM front-end processor of the CDMA network;

BA7, after receiving the mt_fwd message, the GSM front-end processor of the CDMA network returns the GSM mobile terminated request message response (MtDataAck) message to the CDMA service processor; and BA8, the CDMA service processor receives the MtDataAck message, with flow ended.

11. The method according to claim 10, wherein the process of processing a message from a CDMA network to a GSM network comprises the following failure flow:

BB1, If the mobile terminating fails to be sent and is stopped from retrying, the GSM front-end processor of the CDMA network sends an RDS message to the home location register of the GSM network; and the home location registor of the GSM network records the short message service center address of the RDS message which is the address of the GC signaling gateway; and BB2, the mobile switching center of the GSM network returns an rds message to the GSM front-end processor of the CDMA network, with flow ended.

12. The method according to claim 11, wherein the process of processing a message from a CDMA network to a GSM network comprises the following notification flow:

BC1, the mobile switching center of the GSM network triggers the GSM MAP notification message signaling (Alert_Sc) message according to the recorded address of the short message service center and sends it to the GSM front-end processor of the CDMA network; the recorded address of the short message service center is the address of the GC signaling gateway; the GSM front-end processor of the CDMA network sends an AlertScReq message to the CDMA service processor after receiving the Alert_Sc message;

BC2, the CDMA service processor receives the AlertScReq message, processes the retry message and returns the AlertScAck message to the GSM front-end processor of the CDMA network; and the GSM front-end processor of the CDMA network receives the AlertScAck message and returns the Alert_Sc message to the mobile switching center of the GSM network; and BC3, the mobile switching center of the GSM network receives the Alert_Sc message, with the flow ended.

13. A system for enabling a message intercommunication between a GSM network and a CDMA network, comprising a GSM short message center, and a CDMA service processor positioned inside a CDMA short message center; wherein, a CDMA service processor includes a GC signaling gateway, the GC signaling gateway is set to convert a GSM message into a CDMA message according to a mobile terminated request message of a GSM short message service center, and send the converted CDMA message to a target CDMA subscriber, and the CDMA service processor is set to convert a CDMA message into a GSM message and send the converted GSM message to a target GSM subscriber;

wherein the CDMA short message service center comprises a GSM front-end processor of the CDMA network, a CDMA front-end processor, a mobile switching center of the CDMA network, and a home location register;

the GC signaling gateway is set to perform routing query to the mobile switching center of the CDMA network and the home location resister through the CDMA front-end processor according to the information of the target CDMA subscriber in the mobile terminated request message of the GSM short message service center, convert a GSM message into a CDMA message, and send the converted CDMA message to the target CDMA subscriber according to the routing query result; and the CDMA service processor is set to convert a CDMA message into a GSM message, and send a termination request message to the GSM front-end processor of the CDMA network; and the GSM front-end processor of the CDMA network performs routing query and sends the GSM message to a target GSM subscriber.

14. A signaling gateway for enabling a message intercommunication between a GSM network and a CDMA network, the signaling gateway being set in a service processor of a CDMA short message service center,
wherein the signaling gateway is configured to:
receive a mobile terminated request message from a GSM short message service center;
perform routing query according to information of a target CDMA subscriber in the mobile terminated request message to obtain a routing query result; and
convert a GSM message into a CDMA message, and send the converted CDMA message to the target CDMA subscriber according to the routing query result.

* * * * *